United States Patent [19]

Picandet

[11] 3,882,282

[45] May 6, 1975

[54] SYSTEM FOR DETECTING LOOPING OF A SUBSCRIBER'S TELEPHONE LINE

[75] Inventor: Jean Picandet, Paris, France

[73] Assignee: Jeumont-Schneider, Puteaux, France

[22] Filed: July 18, 1973

[21] Appl. No.: 380,393

[30] Foreign Application Priority Data

July 20, 1972 France .............................. 72.26123

[52] U.S. Cl. .......................... 179/18 HB; 179/84 R

[51] Int. Cl. .......................................... H04m 3/02

[58] Field of Search .......... 179/18 F, 18 FA, 18 HB, 179/84 R, 84 A, 99

[56] References Cited

UNITED STATES PATENTS

| | | | |
|---|---|---|---|
| 3,145,266 | 8/1964 | Owen | 179/84 R |
| 3,187,106 | 6/1965 | Steinmetz | 179/18 HB |

*Primary Examiner*—Thomas A. Robinson

*Attorney, Agent, or Firm*—Raymond A. Robic; Arthur Schwartz; David A. Blumenthal

[57] ABSTRACT

A device for detecting looping of a subscriber's telephone line while the station is being rung. The device comprises a circuit with three parallel branches inserted in the a.c. ringing current and causing closing of a contact when the subscriber's station goes off-hook while ringing is being carried out.

4 Claims, 1 Drawing Figure

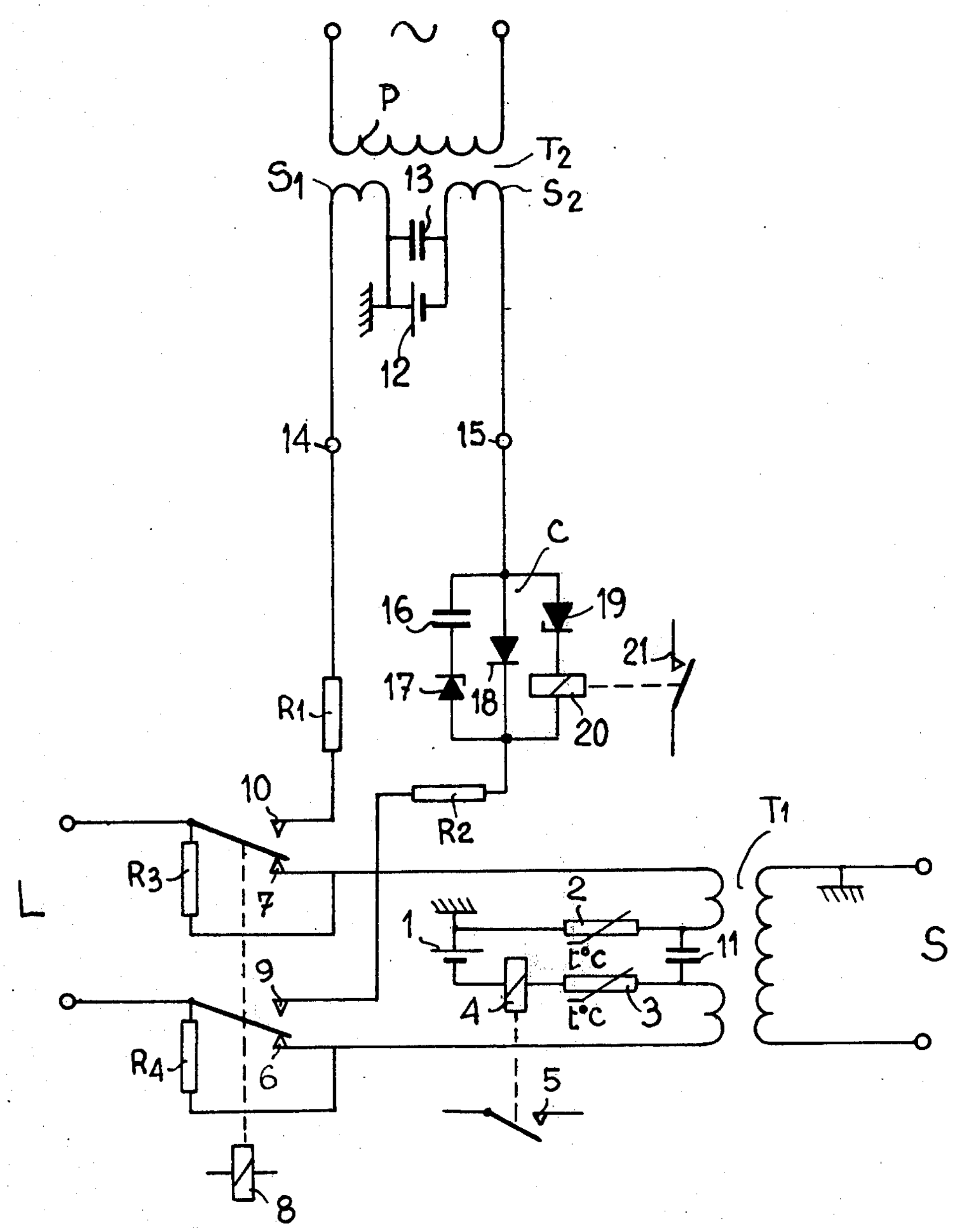
~
P
T2
S1
13
S2
12
14
15
C
16
19
21
17
18
R1
20
10
R2
T1
R3
L
7
2
1
t°c
11
S
9
4
t°c
3
R4
6
5
8

SYSTEM FOR DETECTING LOOPING OF A SUBSCRIBER'S TELEPHONE LINE

BACKGROUND OF THE INVENTION

This invention relates to a system for detecting looping of a subscriber's telephone line, more particularly a system for detecting off-hooking of a called subscriber's station if off-hooking occurs while such station is being rung, i.e., while ringing current is being transmitted.

The ringing current for a subscriber's station is an a.c. current, whereas the current energizing the subscriber's station line is a d.c current. At present there is no way of detecting the presence of a d.c. in the presence of an a.c. unless, as in known systems, a very large and very costly high-inductance loop relay is used.

SUMMARY OF THE INVENTION

The system according to the invention obviates these disadvantages and is a very simple detection system, of use in the case of an automatic electronic telephone exchange. The system according to the invention is characterized in that:

The a.c. supply providing the ringing current for various subscribers is in series with a d.c. supply and energizes each individual subscriber's equipment by way of a circuit comprising three parallel arms, namely:

A capacitor;

A diode connected in opposition to the d.c. supply, and

A first threshold detector controlling an auxiliary circuit connected to the control logic of the telephone exchange, such detector enabling the exchange to detect looping of the subscriber's line;

A second threshold detector is connected in series with the subscriber's speech circuit and also controls the auxiliary circuit, and The ringing relay of each individual subscriber's line is a means of switching the same either to the speech circuit or to the ringing circuit.

BRIEF DESCRIPTION OF THE DRAWINGS

The invention will be more clearly understood with reference to the preferred embodiment and to the single FIGURE showing a circuit diagram of the system according to the invention.

DETAILED DESCRIPTION OF THE PREFERRED EMBODIMENT

A d.c. supply 1 biases an individual line L energizing a subscriber's station (not shown)) via thermistors 2, 3 and half-windings of a transformer $T_1$. The thermistors have a positive temperature coefficient and are a means of limiting current in the event of a short circuit in the line L.

Winding 4 of a first relay is connected between supply 1 and thermistor 3. The first relay closes a normally open contact 5 when the line current exceeds a critical threshold, e.g. when the subscriber goes off-hook. Speech signals S go by way of the transformer $T_1$ and normally closed contacts 6, 7 of a second relay which is a changeover device and whose winding 8 is energized by a ringing control signal from the exchange control logic. Winding 8 causes the contacts 6, 7 to change to the positions 9, 10 during each ringing period and leaves them in their positions 6, 7 during each silent period between two consecutive ringing phases. A capacitor 11 keeps speech signals S out of the d.c. supply 1.

Ringing a.c. current is supplied via a transformer $T_2$ whose primary P is energized by a 50 Hz main supply and whose secondary comprises two symmetrical windings $S_1$, $S_2$ enabling a d.c. supply 12 to be connected in series with the a.c. supply. A capacitor 13 keeps a.c. out of the d.c. supply 12.

The windings $S_1$, $S_2$, which are flowed through by 50 Hz a.c. and by the d.c. from the supply 12, supply one or more identical subscribers' stations connected in parallel between terminals 14 and 15. In each subscriber's equipment the winding $S_1$ is connected to the contact 10 of the second relay via resistance $R_1$, and in each subscriber's equipment the winding $S_2$ is connected, by way of a circuit C having three parallel arms and a resistance $R_2$, to contact 9 of the second relay.

To call a subscriber's station, the ringing control periodically energizes the winding 8 so that the contacts 6, 7 and 9, 10 of the second relay are opened and closed alternately as hereinbefore described. The line L is therefore periodically disconnected from the transformer $T_1$ and connected to the transformer $T_2$. However, resistances $R_3$, $R_4$ which shunt contacts 7 and 6 respectively allow some of the ringing current to flow to transformer $T_1$ to produce a ringing tone.

Resistances $R_1$, $R_2$ limit the ringing current in the event of a fault on line L. If required, the resistances $R_1$, $R_2$ can be replaced by thermistors.

Circuit C comprises three parallel arms - a first arm, in the form of a capacitor 16 in series with a Zener diode 17, a second arm, in the form of a diode 18, and a third arm, in the form of a Zener diode 19 in series with winding 20 of a third relay controlling a contact 21 in an auxiliary circuit (not shown) connected to the exchange logic. The diodes 18, 19 are connected in antiparallel configuration to the diode 17, which is orientated in the direction of the current of the d.c. supply 12. The circuit C is disposed in one of the two connections between line L and transformer $T_2$.

The function of circuit C is to enable off-hooking of a subscriber's station to be detected if the off-hooking occurs during a ringing period - i.e., when the ringing control is energizing winding 8 of the second relay. At each ringing control pulse the second relay changes over to positions 9 and 10 and, until the subscriber goes off hook, only a.c. can flow to the subscriber's station during the ringing periods, the d.c. from supply 12 being blocked by the capacitor in series with the bell of the subscriber's station. In this case there is no detection of d.c. as the contact 21 stays open.

When the subscriber goes off hook, the d.c. from the supply 12 flows through the circuit C and the contact 21 closes in an auxiliary circuit which tells the exchange logic to cancel the ringing instruction to winding 8; the second relay then changes over to contacts 6, 7 and speech signals go to the line L of the called subscriber.

If the subscriber goes off hook during the silence between two ringing phases or trains, contact 5 closes in an auxiliary circuit which tells the exchange logic to cease energizing winding 8.

Theoretically, it would be sufficient to have just the winding 20 of the third relay in parallel with a large capacitor in the circuit C, the capacitor eliminating a.c. components across the winding 20 so that only the d.c. from the supply 12 could energize the winding 20 at off-hooking. In practice, since the capacity of such a capacitor would have to be very large, only an electrolytic capacitor would be suitable, and electrolytic capacitors cannot stand reverse biasing due to the negative half of the a.c. Hence the circuit C comprises, in addition, diode 18, which by passes the unwanted negative bias of the a.c. ringing current around capacitor 16, and Zener diode 17, whose Zener voltage is greater than the voltage drop across the diode 18, to protect the capacitor from any reverse biasing. When the voltage exceeds the threshold of the Zener diode 17, the same conducts and the capacitor 16 can then operate. It is a good idea to have a Zener diode 19 in series with the third-relay winding 20, to ensure that residual voltage due to the voltage drop across the Zener diode 17 does not cause accidental sticking of the third relay.

In the event of off-hooking during ringing, the average line current components due to the presence of the d.c. supply 12 charges the capacitor 16 and the d.c. voltage of the supply 12 is applied across winding 20, so that contact 21 closes and informs the exchange logic of the off-hooking.

The two contacts 5, 21 can be connected in parallel with one another to the same auxiliary circuit connected to the exchange logic.

Optoelectronic devices are just as satisfactory as the devices described for the first and third relays. If optoelectronic devices are used, the winding 20 and/or the winding 4 are/is replaced by a photoemissive diode and the contact 21 and/or the contact 5 are/is replaced by a phototransistor.

The invention is of use in telephony in automatic electronic exchanges.

I claim:

1. A circuit for terminating the application of ringing pulses to a subscriber line when an off-hook condition occurs either during ringing periods or silent periods between ringing pulses comprising:

a subscriber speech circuit having a source of D.C. potential and a transformer, first threshold detector means connected in series with said source of D.C. potential and said transformer for detecting an off-hook condition during a silent period, an A.C. source for providing said ringing pulses, a D.C. source connected in series with said A.C. source, a detector circuit connected in series with said A.C. and D.C. sources, said detector circuit having three parallel paths comprising:

a first path comprising a capacitor, a second path comprising a diode connected in opposition to said D.C. source, and a third path comprising second threshold detector means for detecting an off-hook condition during a ringing period, and switching means normally connecting said subscriber line to said speech circuit, said switching means operative for connecting said subscriber line to said detector circuit during ringing periods, whereby activation of either said first and second threshold detector means terminates the operation of said switching means thereby terminating said ringing pulses on said subscriber line.

2. A circuit according to claim 1, wherein the capacitor is in series with a Zener diode in antiparallel with said diode.

3. A circuit according to claim 1, wherein the first threshold detector means is a Zener diode in series with the winding of a relay.

4. A circuit as recited in claim 1 wherein said first and second threshold detector means comprise photoemissive diodes.

* * * * *